United States Patent
Achilles

(10) Patent No.: US 11,089,363 B2
(45) Date of Patent: Aug. 10, 2021

(54) SYSTEM AND METHOD FOR LOCATION DETERMINATION

(71) Applicant: Edge Networks, Inc., Sun Valley, ID (US)

(72) Inventor: Todd Achilles, Sun Valley, ID (US)

(73) Assignee: Edge Networks, Inc., Sun Valley, ID (US)

( * ) Notice: Subject to any disclaimer, the term of this patent is extended or adjusted under 35 U.S.C. 154(b) by 0 days.

(21) Appl. No.: 16/843,771

(22) Filed: Apr. 8, 2020

(65) Prior Publication Data

US 2020/0322914 A1    Oct. 8, 2020

Related U.S. Application Data

(60) Provisional application No. 62/831,136, filed on Apr. 8, 2019.

(51) Int. Cl.

| | |
|---|---|
| *H04B 17/318* | (2015.01) |
| *H04N 21/442* | (2011.01) |
| *H04N 21/6405* | (2011.01) |
| *H04N 21/6408* | (2011.01) |
| *H04N 21/482* | (2011.01) |

(Continued)

(52) U.S. Cl.
CPC ..... *H04N 21/44222* (2013.01); *G01S 5/0252* (2013.01); *H04B 17/318* (2015.01); *H04N 7/013* (2013.01); *H04N 7/0117* (2013.01); *H04N 21/233* (2013.01); *H04N 21/234* (2013.01); *H04N 21/2381* (2013.01); *H04N 21/25891* (2013.01); *H04N 21/4331* (2013.01); *H04N 21/4398* (2013.01); *H04N 21/4402* (2013.01); *H04N 21/44204* (2013.01); *H04N 21/4532* (2013.01); *H04N 21/4662* (2013.01); *H04N 21/482* (2013.01); *H04N 21/6125* (2013.01); *H04N 21/6405* (2013.01); *H04N 21/6408* (2013.01); *H04W 4/029* (2018.02); *H04W 64/003* (2013.01)

(58) Field of Classification Search
CPC ....... G01S 5/0252; G01S 5/02; H04B 17/318; H04N 21/233; H04N 21/234; H04N 21/2381; H04N 21/25891; H04N 21/4331; H04N 21/4398; H04N 21/4402; H04N 21/44204; H04N 21/44222; H04N 21/4532; H04N 21/4662; H04N 21/482; H04N 21/6125; H04N 21/6405; H04N 21/6408; H04N 7/0117; H04N 7/013; H04W 4/029; H04W 64/003; H04W 64/00

See application file for complete search history.

(56) References Cited

U.S. PATENT DOCUMENTS

| | | | |
|---|---|---|---|
| 5,936,572 A * | 8/1999 | Loomis | G01C 21/206 342/357.29 |
| 6,839,560 B1 * | 1/2005 | Bahl | G01C 21/206 342/450 |

(Continued)

*Primary Examiner* — Nathan S Taylor
(74) *Attorney, Agent, or Firm* — Krishna Kalidindi

(57) ABSTRACT

A method for determining location of a premises is disclosed. The method includes measuring a signal strength of a plurality of communication signals received at the premises, obtaining data associated with a source of the signals, estimating a propagation loss for the received signal, determining a distance between a source of each of the signals and the premises based on the estimated propagation loss, and triangulating the location of the premises.

12 Claims, 4 Drawing Sheets

(51) Int. Cl.
*H04N 21/466* (2011.01)
*H04N 21/45* (2011.01)
*H04W 4/029* (2018.01)
*G01S 5/02* (2010.01)
*H04W 64/00* (2009.01)
*H04N 21/233* (2011.01)
*H04N 21/234* (2011.01)
*H04N 21/258* (2011.01)
*H04N 21/433* (2011.01)
*H04N 21/439* (2011.01)
*H04N 21/4402* (2011.01)
*H04N 7/01* (2006.01)
*H04N 21/2381* (2011.01)
*H04N 21/61* (2011.01)

(56) References Cited

U.S. PATENT DOCUMENTS

| | | | | |
|---|---|---|---|---|
| 7,725,111 | B2* | 5/2010 | Dressler | G01S 5/0252 |
| | | | | 455/456.1 |
| 8,106,828 | B1* | 1/2012 | Do | H04H 60/51 |
| | | | | 342/463 |
| 8,938,201 | B2* | 1/2015 | Boulton | G01S 5/0221 |
| | | | | 455/67.14 |
| 9,213,083 | B1* | 12/2015 | Carter | G01S 5/12 |
| 9,696,164 | B2* | 7/2017 | Hansen | G01C 21/206 |
| 2003/0146871 | A1* | 8/2003 | Karr | G01S 5/02 |
| | | | | 342/457 |
| 2003/0156063 | A1* | 8/2003 | Spilker, Jr. | G01S 5/0054 |
| | | | | 342/464 |
| 2004/0203436 | A1* | 10/2004 | Oesterling | H04B 17/20 |
| | | | | 455/67.11 |
| 2004/0207556 | A1* | 10/2004 | Spilker, Jr. | G01S 5/0215 |
| | | | | 342/464 |
| 2005/0015162 | A1* | 1/2005 | Omura | H04N 21/41422 |
| | | | | 700/94 |
| 2005/0066373 | A1* | 3/2005 | Rabinowitz | H04N 21/8126 |
| | | | | 725/131 |
| 2007/0008220 | A1* | 1/2007 | Rabinowitz | H04N 21/2668 |
| | | | | 342/458 |
| 2007/0050824 | A1* | 3/2007 | Lee | H04H 60/51 |
| | | | | 725/81 |
| 2008/0299992 | A1* | 12/2008 | Eitan | H04W 64/003 |
| | | | | 455/456.5 |
| 2008/0311870 | A1* | 12/2008 | Walley | H04H 60/51 |
| | | | | 455/186.1 |
| 2009/0005075 | A1* | 1/2009 | Margrave | H04W 64/00 |
| | | | | 455/456.2 |
| 2010/0176992 | A1* | 7/2010 | T'siobbel | G01S 19/425 |
| | | | | 342/357.25 |
| 2013/0317944 | A1* | 11/2013 | Huang | G01S 5/0263 |
| | | | | 705/26.61 |
| 2015/0046952 | A1* | 2/2015 | Beals | H04N 21/4263 |
| | | | | 725/68 |
| 2015/0067741 | A1* | 3/2015 | Shang | H04N 21/4524 |
| | | | | 725/62 |
| 2015/0308835 | A1* | 10/2015 | Hansen | G01C 21/206 |
| | | | | 701/526 |

* cited by examiner

SYSTEM AND METHOD FOR LOCATION DETERMINATION

RELATED APPLICATIONS/CLAIM FOR PRIORITY

This application claims the benefit of the filing date of U.S. Provisional Application No. 62/831,136 filed on Apr. 8, 2019. This application is also related to U.S. Provisional Application No. 62/860,799 filed on Jun. 13, 2019 and to U.S. patent application Ser. No. 16/578,159 filed on Sep. 20, 2019; Ser. No. 16/591,767 filed on Oct. 3, 2019; Ser. No. 16/664,808 filed on Oct. 26, 2019 and Ser. No. 16/833,709 filed on Mar. 30, 2020. The subject matter of each of these applications is incorporated herein in its entirety by reference.

BACKGROUND

This disclosure is directed to location determination and more specifically to location determination utilizing communication signals.

A recently adapted television standard, ATSC 3.0 (Advanced Television Systems Committee), provides for the broadcast (over the air, OTA) of television signals in a format that is similar to the format of data that is communicated over a broadband/internet connection. ATSC 3.0 facilitates delivery of television programming (media content in the form of signals) across multiple media such as OTA and over a network such as a broadband network to a viewer.

OTA interface is a traditional media for broadcasting to all receivers within a physical viewing range. Transmission over a broadband (or network), on the other hand, can take place via unicast (one destination) or multicast (multiple destinations).

Television broadcast transmitters, mounted on transmission towers for example, are co-located at a common location within a media market. The common location may be an elevated site for example. In a traditional broadcast market (such as a designated market area or DMA), it is unusual for TV broadcast transmission towers to be deployed at different physical locations. Such an arrangement may require a viewer or user to re-point the antenna for viewing the different channels. Existing broadcast technologies are not designed to support secondary transmission locations (single frequency network—SFN) nor do they assume that signals are widely distributed within a DMA.

ATSC 3.0 supports secondary broadcast sites in a market (SFN). Such secondary sites are similar to a mobile network in that they could be deployed at different locations within a media market. In a NGTV system, the strongest signals for each channel could be scattered throughout the market. A future viewer could face a situation where available NGTV channels may be located in 360 degrees around their home. Systems and methods that leverage the functionality of ATSC 3.0 to determine a viewer location is desirable.

SUMMARY

According to an example embodiment, a method of determining location of a premises is disclosed. The method comprises: measuring a signal strength of a plurality of communication signals received at the premises; obtaining data associated with a source of the signals; estimating a propagation loss for the received signal; determining a distance between a source of each of the signals and the premises based on the estimated propagation loss; and triangulating the location of the premises.

According to another example embodiment, a set-top box is disclosed. The set top comprises: a communication interface configured to: receive and transmit data via a network to a server, the received data including information on a transmission entity of communication signals; a processor configured to: measure a signal strength of the received communication signals; compare the measured signal strength values with the communication signal transmission entity information; estimate a propagation loss for the received signal based on the comparison; and determine a location co-ordinate of a premises associated with the set top box based on propagation loss; and a memory configured to store: the received data; and the determined location co-ordinates, wherein the communication interface is further configured to transmit the location co-ordinates.

According to a further example embodiment, a non-transitory computer readable medium is disclosed. The medium has instructions stored thereon for execution by a processor of a controller. The instructions cause the processor to: measure a signal strength of a plurality of communication signals received at the premises; obtain data associated with a source of the signals; estimate a propagation loss for the received signal; determine a distance between a source of each of the signals and the premises based on the estimated propagation loss; and triangulating the location of the premises.

BRIEF DESCRIPTION OF THE DRAWINGS

The several features, objects, and advantages of exemplary embodiments will be understood by reading this description in conjunction with the drawings. The same reference numbers in different drawings identify the same or similar elements. In the drawings.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the exemplary embodiments.

Reference throughout this specification to an "example embodiment" or "example embodiments" means that a particular feature, structure, or characteristic as described is included in at least one embodiment. Thus, the appearances of these terms and similar phrases in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

A zip code is usually the smallest geographic area within which a viewer can be identified. For local advertising targeting purposes, a more precise location identification is desirable.

Communication signals such as television signals broadcast over the air (OTA) can be received via an antenna at a user premises. Characteristics associated with the received signals can be used to determine a distance between the premises and the location of a signal source. Distance between the premises and a plurality of signal source locations can be determined. The distances can be used to determine a location of the premises.

Figure 1:
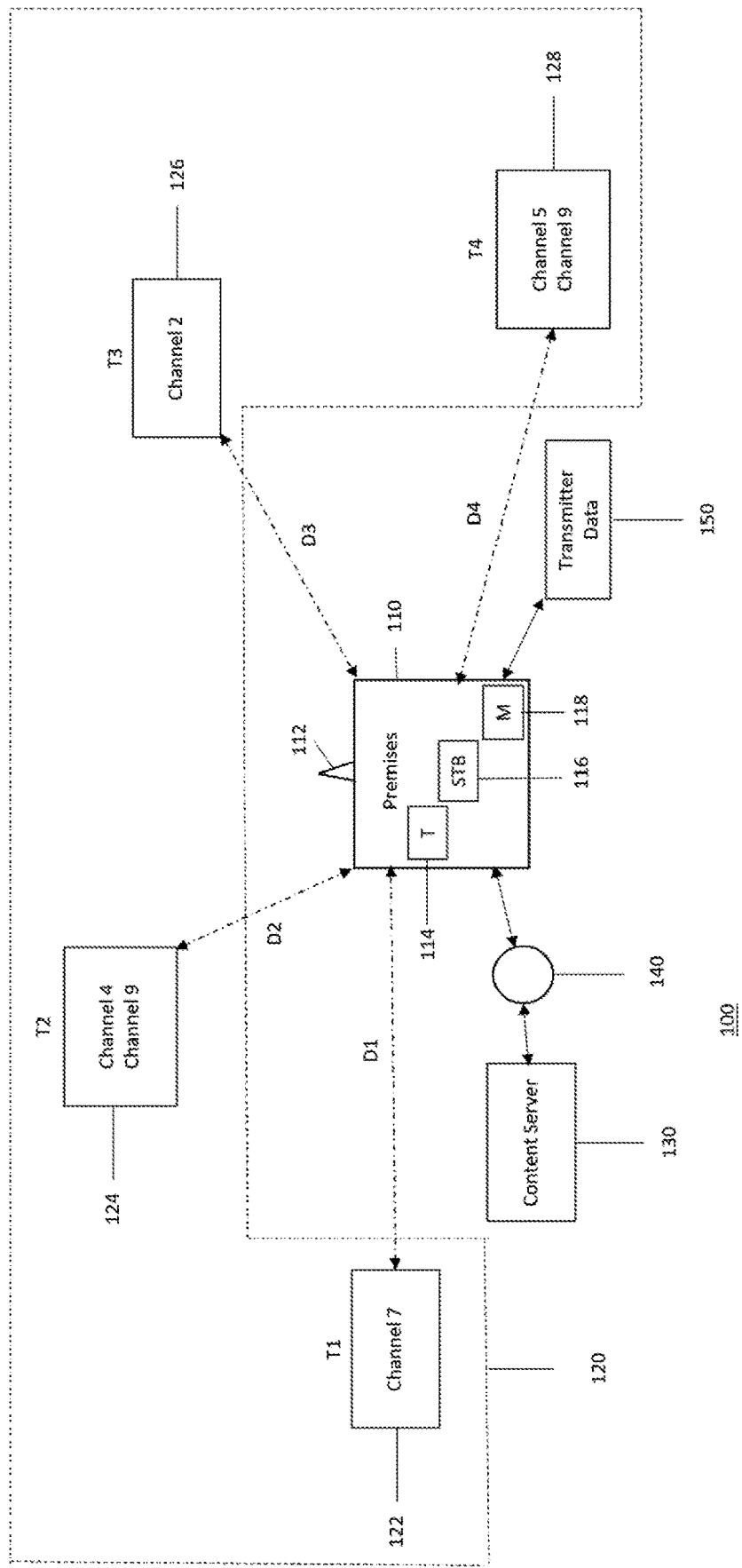
FIG. 1 illustrates a block diagram of an example system for determining a premises location according to the present disclosure.

An example embodiment of a system for determining a premises location is illustrated in FIG. 1. System 100 can include a user premises 110 receiving television signals from a plurality of transmitters 120 situated at four locations T1, T2, T3 and T4 designated as 122, 124, 126 and 128. Each of locations T1, T2, T3 and T4 may transmit signals corresponding to at least one or more channels.

Transmitter T1 designated as 122 may be broadcasting signals from channel 7. Transmitter T2 (124) may be broadcasting signals from channels 4 and 9. Transmitter T3 (126) may be broadcasting signals from channel 2. Transmitter T4 (128) may be broadcasting signals from channels 5 and 9.

System 100 illustrates: (i) signals for channels being broadcast from a plurality of locations—signals for (five) channels 2, 4, 5, 7 and 9 being broadcast from four locations T1-T4; (ii) multiple channels being broadcast from one location—signals from channels 4 and 9 being broadcast from location T2, signals from channels 5 and 9 being broadcast from location T4; and (iii) a channel being broadcast from multiple locations—signals from channel 9 from being broadcast from T2 and T4.

The user premises 100 may be at a different distance from each of T1, T2, T3 and T4. Each of the distances D1, D2, D3 and D4 between the premises and each of the locations may be a distinct value. That is, D1 may not equal to any of D2, D3 and D4. Similarly, D2 may not be equal to any of D3 and D4. D3 may not be equal to D4. In some embodiments, some of these distances may be equal to another—that is, the premises may be of equal distance from two or more of the transmission locations.

Premises 100 may have associated therewith one or more receiving antennas 120 for receiving the signals from the various transmission sites. The signals can be processed by a tuner (T) 114 and communicated via a wired or wireless medium to a network node.

The network node can be connected to a set-top box (STB) 116. The set-top box 116 can provide data signals (audio/video signals) to a display mechanism (M) 118. The set-top box can also receive inputs from users such as channel selection for example. The user may interact with the set-top box through a remote control or via an app on a portable or mobile device.

The display mechanism 118 may be a television, a monitor or other such display device including, but not limited to, a computing device, a mobile communication device or the like.

Under ATSC 3.0, the premises 110 may also be connected to a content server 130 which may be accessible via a network 140. The content server 130 may also provide programming via a broadband network using unicast to one premises or using multicast to a plurality of premises.

Premises 100 may also include a computing or processing device to co-ordinate the processing of received signals or to process user inputs. The processing device may be incorporated into the tuner or into the set-top box for example. The processing device can be the set-top box.

Location determination may be used to provide targeted advertising. Targeted advertising may include information and/or services available near a user's location. Examples of such information may include: information about dining, shopping, museums, parks, entertainment, schools, news, weather, sports, professional services such as medical services, personal services such as hair salons or the like.

An example method for determining location may include evaluating received signals. The Federal Communication Commission (FCC) maintains a public record for each channel and transmission site. The record can include channel identification, network affiliation, transmitting power and location co-ordinates. The record can be maintained and updated by the FCC or another entity at a server for example. In the system of FIG. 1, this data may be maintained at a publicly accessible location such as at server 150. Server 150 may be accessible to a processing device associated with premises 110 over a network.

A processing device associated with a premises can access this information over a network such as the internet. The information for a DMA (designated market area) in which the premises is located can be accessed by the processing device. In some embodiments, the information can be accessed in real time from the FCC or another entity maintaining the records.

The information can also be stored locally at the premises in some embodiments. The transmission site data (i.e. a broadcast information table), can be pushed, via ATSC 3.0 to the set-top box.

As signals are received, the processor associated with the premises can measure the signal strength in a known manner. The measured signal strength can be compared with the transmitting power level to estimate the free space propagation loss for the particular frequency. The estimated propagation loss can be used to determine a distance from the transmission site to the premises. This process can be repeated for a plurality of channels and transmission sites. The distances thus determined can be used to estimate a location of the premises using known triangulation techniques.

Figure 2:
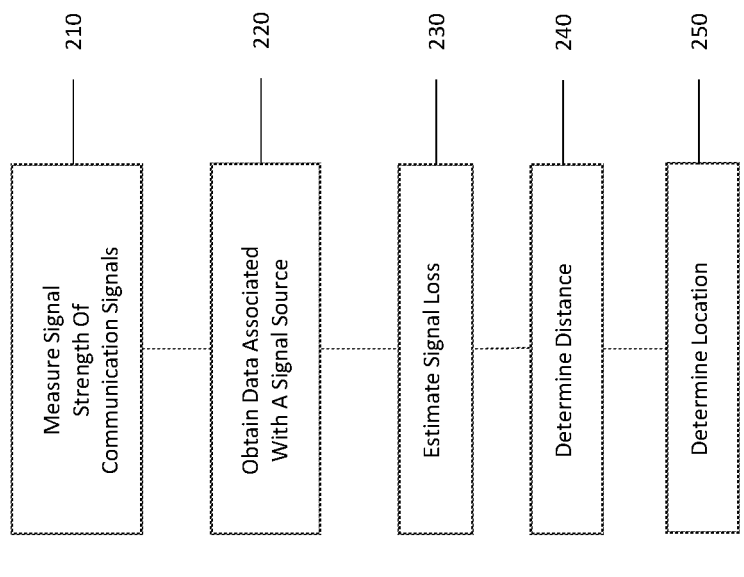
FIG. 2 illustrates a flow chart of an example method for determining a viewer location according to the present disclosure.

A method 200 in accordance with example embodiments may be illustrated with reference to FIG. 2. The method includes measuring signal strength of the received signals at 210. Information related to the channel corresponding to the received signals may be accessed at 220. This information may either be stored locally (at the premises) or may be accessed from the FCC or other publicly available source in real time.

The measured signal strength may be compared at 230 with the channel signal information obtained from the FCC source (such as channel identification, transmitter location and transmitted power level) to estimate a propagation loss. The propagation loss can be used to determine a distance between the premises and the transmission location at 240.

In some embodiments, the direction of the transmitter site with reference to the premises may also be determined. The distance (and directions) can be determined from the premises to a plurality of transmission sites. The distances may be used to determine a location of the premises at 250. A location co-ordinate can be assigned to the determined location.

Figure 4:
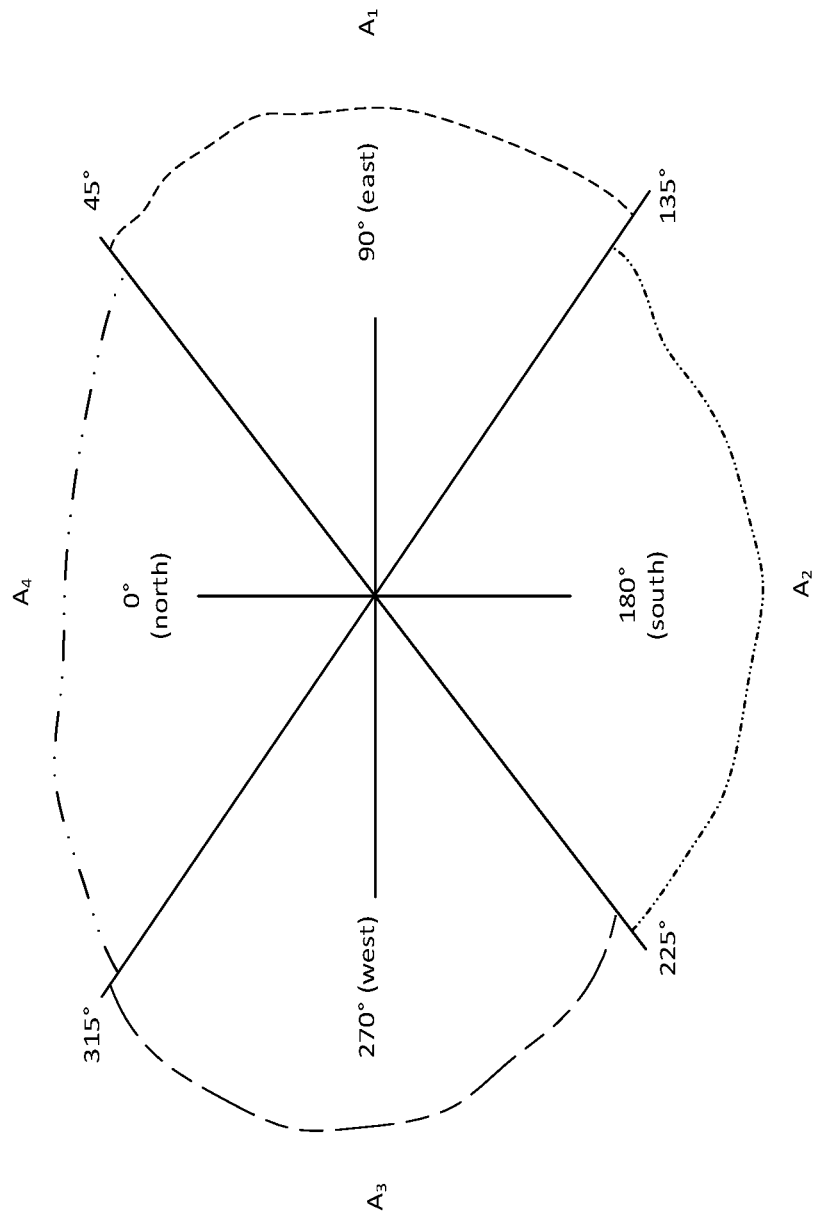
FIG. 4 illustrates a block diagram of an example antenna arrangement of the present disclosure.

In some example embodiments, directional antennas may be utilized. As illustrated in FIG. 4, a plurality of directional antennas may cover a particular angular range. The sum of the coverage range of the antennas may add up to 360° (degrees).

In a simple example, four directional antennas may be implemented each covering 90°. Antenna $A_1$ (East) may receive signals between 45° and 135°; antenna $A_2$ (South) may receive signals between 135° and 225°; antenna $A_3$ (West) may receive signals between 225° and 315° and antenna $A_4$ (North) may receive signals between 315° and 45°. The antenna beam with the best signal may be utilized to further narrow the distance and direction estimate between the source of the signal (i.e. transmission site) and the premises.

The measured signal strengths can be stored at the premises or provided to the server 150. Such information can be used to potentially adjust transmitting power (increase or decrease) of the transmission sites.

Figure 3:
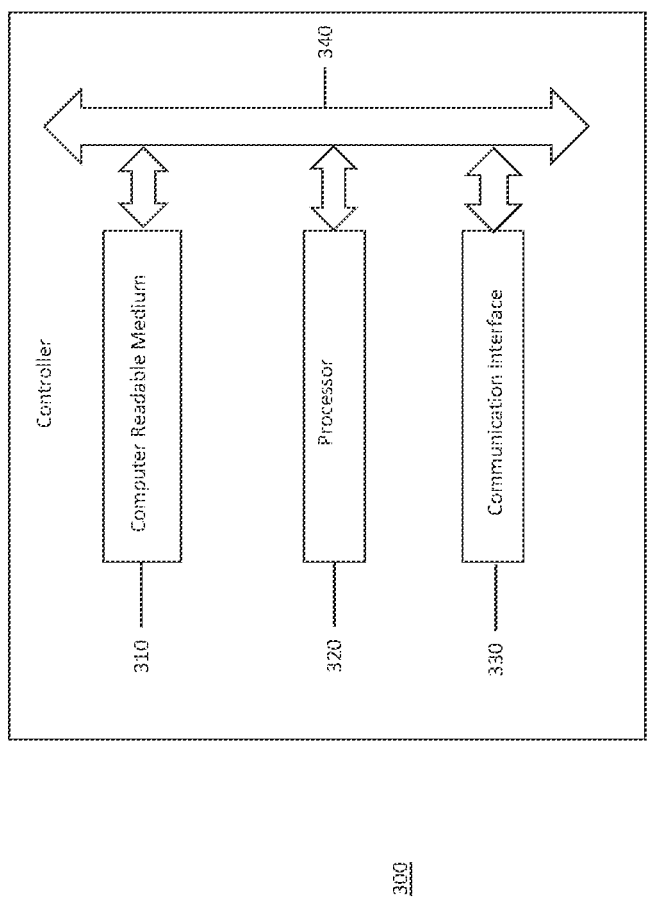
FIG. 3 illustrates an example controller for implementing a location determining system of the present disclosure.

A controller may be included within set-top box 116 within premises 110 described above (FIG. 1). Controller 300, as illustrated in FIG. 3, can coordinate the various actions described. Controller 300 may include a machine-readable medium 310, a processor 320, a communications interface 330 and a system bus 340.

The various components of controller 300 may interconnect and communicate via bus 340. Controller 300 is not limited to include the components illustrated—it can include more or less components than those depicted. Controller 300 may communicate with server 150 to retrieve transmission site information. The functionality of controller 300 may further include that usually associated with a set-top box.

The machine-readable medium 310 may be any electronic, magnetic, optical, or other physical storage device that stores executable instructions. The machine-readable medium 310 can be encoded to store executable instructions that cause the processor 320 to perform operations, methods and processes in accordance with various examples described herein (such as method 200 of FIG. 2 above). In various examples, the machine-readable medium 310 may be non-transitory.

Machine-readable medium 310 may store therein the transmission site data obtained from server 150 for example. The data obtained from server 150 may be stored in a lookup table. Medium 310 may also store the various signal strength levels measured for the plurality of channels (i.e. 2, 4, 5, 7 and 9) from the plurality of transmitters (T1, T2, T3 and T4). The distances to each of the transmitter sites can also be stored therein. The location coordinates for the premises derived from the distances can also be stored within medium 310.

The processor 320 may be one or more central processing units (CPUs), microprocessors, or other hardware devices suitable for retrieval and execution of one or more instructions stored in the machine-readable medium 310. The processor 320 may fetch, decode, and execute the instructions to enable the controller 300 to perform operations in accordance with various examples described herein. That is, the signal loss can be estimated by the processor. The distances (and direction) may also be determined by the processor.

For some examples, the processor 320 includes one or more electronic circuits comprising a number of electronic components for performing the functionality of one or more of the instructions included in the methods described above (for example, in FIG. 2).

The communications interface 330 may facilitate data communications between the set-top box and the user. The communication may include receiving a user selection (such as channel selection) for example.

Communication interface 330 may also facilitate communication between controller 300 and server 150 (of FIG. 1). Processor 320 can also facilitate signal strength measurement as described above.

The signal strength measurements and free space propagation loss values for each of the channels may be stored either locally at the set-top box or at a remote server. Data stored in the remote server may be available to operators of the plurality of transmission sites such as those illustrated in FIG. 1. The measurements and propagation loss values may be used by transmission site operators, channel/station operators or other entities to evaluate the performance of the broadcasts from corresponding transmitters.

The information can assist the operators in planning increased or decreased transmitting power, making seasonal adjustments or in making decision regarding adding secondary transmission towers or the like. Stated another way, the gathered information may be utilized to improve the broadcast service. In this manner, this process may function as a learning system gathering performance information in an ongoing manner.

Although exemplary embodiments have been disclosed, it will be apparent to those skilled in the art that various changes and modifications can be made which will achieve some of the advantages of embodiments without departing from the spirit and scope of the disclosure. Such modifications are intended to be covered by the appended claims.

Further, in the description and the appended claims the meaning of "comprising" is not to be understood as excluding other elements or steps. Further, "a" or "an" does not exclude a plurality, and a single unit may fulfill the functions of several means recited in the claims.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in relevant art.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of determining location of a premises, the method comprising:
  measuring, by a processor associated with the premises, a signal strength of a plurality of television signals received at the premises, the signals being broadcast on an over the air (OTA) interface; obtaining data associated with a source of the television signals from a server having stored therein transmitting power levels of the source of the television signals, the premises being connected to the server via a broadband connection; estimating a propagation loss for the received signal based on comparison of the measured signal strength to the transmitting power levels obtained from the server; determining a distance between a source of each of the signals and the premises based on the estimated propagation loss; triangulating the location of the premises; and determining a direction of the source of the signal with respect to the location of the premises.

2. The method of claim 1, further comprising:
receiving signals from at least three sources.

3. The method of claim 1, further comprising:
storing the measured signal strength values.

4. The method of claim 1, wherein the obtained data comprises:
identification of a transmission site for the signal source.

5. The method of claim 4, wherein the obtained data comprises: a channel identification associated with the signal source.

6. The method of claim 4, wherein the obtained data comprises: a location co-ordinate of the signal source.

7. The method of claim 1, further comprising:
transmitting the location co-ordinates.

8. A non-transitory computer-readable medium having instructions stored thereon, the instructions being executable by a processor of a controller, the instructions causing the processor to:
measure a signal strength of a plurality of television signals received at a premises, the signals being broadcast on an over the air (OTA) interface; obtain data associated with a source of the television signals from a server having stored therein transmitting power levels of the source of the television signals, the premises being connected to the server via a broadband connection; estimate a propagation loss for the received signal based on comparison of the measured signal strength to the transmitting power levels obtained from the server; determine a distance between a source of each of the signals and the premises based on the estimated propagation loss; triangulate location of the premises; and determine a direction of the source of the signal with respect to the location of the premises.

9. The non-transitory computer-readable medium of claim 8, wherein the instructions cause the processor to:
receive signals from at least three sources.

10. The non-transitory computer-readable medium of claim 8, wherein the instructions cause the processor to: store the
measured signal strength values.

11. The non-transitory computer-readable medium of claim 8, wherein the obtained data comprises at least one of: an identification of a transmission site for the signal source, a channel identification associated with the signal source and a location co-ordinate of the signal source.

12. The non-transitory computer-readable medium of claim 8, wherein the instructions cause the processor to:
transmit the location co-ordinates.

* * * * *